US012808687B2

(12) United States Patent
Wagner et al.

(10) Patent No.: US 12,808,687 B2
(45) Date of Patent: Nov. 24, 2026

(54) METHOD FOR ALIGNING TWO MAP DATASETS

(71) Applicant: Robert Bosch GmbH, Stuttgart (DE)

(72) Inventors: Andre Wagner, Hannover (DE); Max Kirstein, Hohenhameln (DE); Thomas Wenzel, Hamburg (DE); Thorben Funke, Sarstedt (DE)

(73) Assignee: ROBERT BOSCH GMBH, Stuttgart (DE)

( * ) Notice: Subject to any disclaimer, the term of this patent is extended or adjusted under 35 U.S.C. 154(b) by 43 days.

(21) Appl. No.: 18/899,517

(22) Filed: Sep. 27, 2024

(65) Prior Publication Data

US 2025/0116530 A1 Apr. 10, 2025

(30) Foreign Application Priority Data

Oct. 5, 2023 (DE) ..................... 10 2023 209 728.1

(51) Int. Cl.
*G01C 21/00* (2006.01)
*G06T 7/33* (2017.01)

(52) U.S. Cl.
CPC ............ *G01C 21/3859* (2020.08); *G06T 7/33* (2017.01); *G06T 2207/20084* (2013.01); *G06T 2207/30252* (2013.01)

(58) Field of Classification Search
CPC .................. G01C 21/3859; G06T 7/33; G06T 2207/20084
See application file for complete search history.

(56) References Cited

U.S. PATENT DOCUMENTS

2020/0025931 A1* 1/2020 Liang ...................... G01S 17/89
2023/0105331 A1* 4/2023 Cheng ................ G06F 18/2163 345/419

OTHER PUBLICATIONS

J. Hu, L. Shen and G. Sun, "Squeeze-and-Excitation Networks," 2018 IEEE/CVF Conference on Computer Vision and Pattern Recognition, Salt Lake City, UT, USA, 2018, pp. 7132-7141, doi: 10.1109/CVPR.2018.00745. (Year: 2018).*
Choy et al., "Deep Global Registration," 2020 IEEE/CVF Conference on Computer Vision and Pattern Recognition (CVPR), 2020, pp. 2514-2523. https://openaccess.thecvf.com/content_CVPR_2020/papers/Choy_Deep_Global_Registration_CVPR_2020_paper.pdf Downloaded Sep. 27, 2024.

(Continued)

*Primary Examiner* — Scott A Browne
*Assistant Examiner* — Josephine Rich
(74) *Attorney, Agent, or Firm* — NORTON ROSE FULBRIGHT US LLP

(57) ABSTRACT

A method for aligning two map datasets. The method includes: providing two map datasets, each containing environmental information, wherein the environmental information in the two map datasets has been detected by a sensor of a mobile device, and at least one of the two map datasets is a sparse map dataset; providing the two map datasets as input feature data or determining input feature data based on the two map datasets; carrying out an alignment of the two map datasets using a machine learning algorithm based on sparse convolution, wherein output data including information about a transformative relation between the two map datasets are generated from the input feature data, via intermediate feature data in one or more intermediate layers.

13 Claims, 4 Drawing Sheets

(56) References Cited

OTHER PUBLICATIONS

Choy et al., "Fully Convolutional Geometric Features," 2019 Proceedings of the IEEE/CVF International Conference on Computer Vision (ICCV), 2019, pp. 8957-8965.

Hu et al., "Squeeze- and Excitation Networks," 2018 Proceedings of the IEEE/CVF Conference on Computer Vision and Pattern Recognition, 2018, pp. 7132-7141.

* cited by examiner

METHOD FOR ALIGNING TWO MAP DATASETS

CROSS REFERENCE

The present application claims the benefit under 35 U.S.C. § 119 of German Patent Application No. DE 10 2023 209 728.1 filed on Oct. 5, 2023, which is expressly incorporated herein by reference in its entirety.

FIELD

The present invention relates to a method for aligning two map datasets for determining navigation information for a mobile device that is moving or is to move in an environment, to a mobile device and to a system and a computer program for carrying out the method.

BACKGROUND INFORMATION

Mobile devices, such as vehicles or robots that move in an at least partially automated manner, typically move in an environment, such as a home, in a garden, on a factory floor or on the road, in the air or in water. One of the fundamental problems of such or any other mobile device is to navigate and, in particular, to orient itself, i.e., to know what the environment looks like, in particular where obstacles or other objects are, and where it is located (in absolute terms). For this purpose, the mobile device can, for example, be equipped with various sensors, such as cameras, lidar sensors, radar sensors or even inertial sensors or GNSS sensors (generalization of GPS sensors, for coarse positioning), with the aid of which the environment and the movement of the mobile device can be detected, for example, in two or three dimensions.

SUMMARY

The present invention provides a method for aligning two map datasets, a mobile device, and a system and a computer program for carrying out the method. The following description relate to advantageous example embodiments of the present invention.

The present invention is generally concerned with mobile devices that move, or at least can move, in an environment, such as on a road or in a work area. Examples of such mobile devices (or mobile work equipment) are robots and/or drones and/or vehicles that move in a partially automated or (fully) automated manner (on land, in water or in the air). Examples of robots that can be considered are household robots, such as cleaning robots (e.g. in the form of vacuum and/or mopping robots), floor- or street-cleaning devices, construction robots or lawnmower robots, but also other so-called service robots, as well as vehicles that move in an at least partially automated manner, e.g., passenger transport vehicles or goods transport vehicles (also so-called industrial trucks, e.g. in warehouses, but generally also passenger cars and trucks), but also aircraft, such as so-called drones or watercraft.

Such a mobile device has in particular a control or regulating unit and a drive unit for moving the mobile device, so that the mobile device can be moved in the environment, e.g. along a movement path. For this purpose, navigation information can be determined, for example, specific instructions as to in which direction the mobile device should travel in order to follow the movement path. These can then be implemented via the control or regulating unit as well as the drive unit. This can be referred to generally as the navigation of the mobile device.

Moreover, a mobile device can have one or more sensors by means of which the environment or information in the environment and possibly also from the mobile device itself can be detected. As mentioned, these can be, for example, cameras, lidar sensors, radar sensors, ultrasonic sensors or inertial measuring units (or inertial sensors) as well as a wheel odometry system, with the aid of which the environment and the movement of the mobile device are detected, for example, in two or three dimensions. Depending on the type of mobile device, however, other or further sensors may also be provided.

One aspect of navigation is the so-called mapping, which is used, for example, in the creation of maps of the environment. Such maps can also be used as sensors to a certain extent. This is also referred to as scan matching or map alignment. One aim here is to determine an aligning transformation between input data, which can come from any sensors, such as lane markings detected by a vehicle camera or radar echoes. This transformation is generally a key first step in creating a consolidated map from multiple, partially overlapping sensor data (or a representation derived from them). In general, this involves aligning two map datasets.

An example of this is the scan matching of so-called point clouds from lidar sensors. In particular, the entire point cloud measured or detected by the laser scanner is used; a point cloud is a set of points in the environment that are determined using the laser scanner or lidar sensor. Each point can be assigned a distance from the mobile device or laser scanner, as well as an orientation relative to a reference orientation of the mobile device or laser scanner. The point cloud usually corresponds to one or more "point lines" along the contour of the objects in the field of view; however, the points may also lie only approximately on such a line.

However, this point cloud alone does not allow the position and/or orientation of the mobile device in the environment to be determined. For this purpose, the point cloud or set of points is compared with a reference point cloud or reference set of points. A transformation can then be determined that best brings the point cloud (or set of points) into congruence or coincidence with the reference point cloud (or reference set of points), i.e., aligns both with one another. This transformation then corresponds to a position and/or orientation of the mobile device when the point cloud is detected relative to the reference point cloud or to a coordinate system of the reference point cloud. If the reference point cloud is a map of the environment or at least part of it, the current position and/or orientation of the mobile device in the environment can be determined. The reference point cloud (or map of the environment) can be expanded, for example, by constantly or repeatedly adding new point clouds or parts thereof.

This is also referred to as SLAM. SLAM ("Simultaneous Localization and Mapping") is a method in robotics in which a mobile device, such as a robot, can or must simultaneously create a map of its environment and estimate its spatial position within this map. It is used, for example, to recognize obstacles and thus supports autonomous navigation.

On the basis of such a SLAM graph, a map of the environment (environment map) in which the mobile device moves can have been determined or can be determined. With each new map dataset containing information about the environment and/or about the mobile device, which information is obtained from or based on one or more sensors of the mobile device, the map (or the SLAM graph) can be expanded or updated.

An attempt is made in the process to bring the two map datasets, i.e., an existing and a new map dataset, into coincidence, at least within certain tolerances, in order to determine the movement or trajectory of the mobile device.

In principle, the mapping process on the one hand and the localization process on the other hand can also be decoupled from one another (i.e., the map is created, played out to the mobile device, which then locates itself in the map). Scan matching or the alignment of two map datasets can be used in both cases, i.e., combined or decoupled mapping and localization processes.

Within the scope of the present invention, a method is provided for aligning two map datasets for determining navigation, such as a map or a trajectory for a mobile device that is moving or is to move in an environment. According to an example embodiment of the present invention, for this purpose, two map datasets are provided, each containing environmental information. In both of the two map datasets, the environmental information was collected from the mobile device and/or the environment by means of a sensor of the mobile device. However, the same sensor does not have to have been used for both map datasets. The two map datasets are provided as input feature data, or input feature data are determined on the basis of the two map datasets.

An alignment, i.e., a matching, of the two map datasets is then carried out. In general, there are different approaches to this, both traditional and machine-learning-based (ML) approaches, as described in C. Choy, W. Dong, and V. Koltun, "Deep global registration", in Proceedings of the IEEE/CVF conference on computer vision and pattern recognition, pp. 2514-2523, 2020. Many of these approaches use two steps: In the first step, so-called feature descriptors are generated, as described, for example, in C. Choy, J. Park, and V. Koltun, "Fully convolutional geometric features", in Proceedings of the IEEE/CVF International Conference on Computer Vision, pp. 8958-8966, 2019. The aligning transformation is then determined on the basis of these feature descriptors, often as a combination of traditional and ML methods.

The alignment or matching of the two map datasets is thus carried out in particular using a machine learning algorithm. In particular, a so-called convolutional neural network (CNN) is considered as a machine learning algorithm. Output data are generated from the input feature data via intermediate feature data (feature maps) in one or more intermediate layers (so-called hidden layers). The output data comprise information about a transformative relation (or simply a transformation) between the two map datasets. The output data can then be provided for use in determining the navigation information.

Machine learning algorithms or CNNs that can be considered include those described in C. Choy, W. Dong, and V. Koltun, "Deep global registration", in Proceedings of the IEEE/CVF conference on computer vision and pattern recognition, pp. 2514-2523, 2020", or in C. Choy, J. Park, and V. Koltun, "Fully convolutional geometric features", in Proceedings of the IEEE/CVF International Conference on Computer Vision, pp. 8958-8966, 2019.

However, it has now been found that the map datasets to be aligned are often so-called sparse map datasets, i.e., map datasets that, for example, contain data only at specific points in space or within a detection range. Another term for a sparse map dataset is a sparsely or poorly populated map dataset. A specific example of this are map datasets that contain images and/or positions of specific objects, such as lane markings, road posts, or traffic signs. In the case of images (in this case digital images), it is possible, for example, for only the specific objects, such as traffic signs to be considered, while other regions are disregarded.

A so-called sparse convolution can then be used to align the map datasets. This entails many advantages, for example, computing effort and memory requirements are greatly reduced. However, sparse convolutions are generally computed only at positions of the input data (input feature data) where the input tensor was non-zero in order to preserve sparsity. As a consequence, however, the receptive field, i.e., the detected region, of the neural networks used or machine learning algorithms in general can "tear open" if the range of a sparse convolution is not sufficient to bridge a gap in the data. This is because the convolutional kernel is generally not large enough to bridge such a gap in the data. This can be compensated by either significantly increasing the size of the convolutional kernels or by using large-radius pooling operations; however, all of this comes at the cost of drastic increases in computational complexity or the loss of finely granular information.

This problem is relevant and unsolved in particular in the context of the machine learning algorithms mentioned in C. Choy, W. Dong, and V. Koltun, "Deep global registration", in Proceedings of the IEEE/CVF conference on computer vision and pattern recognition, pp. 2514-2523, 2020, and C. Choy, J. Park, and V. Koltun, "Fully convolutional geometric features", in Proceedings of the IEEE/CVF International Conference on Computer Vision, pp. 8958-8966, 2019, since global relationships are often more relevant for alignment than local ones.

Within the scope of the present invention, two map datasets are now aligned, of which at least one, but preferably both, is a so-called sparse map dataset.

According to an example embodiment of the present invention, carrying out the alignment comprises one or more adjustment operations, wherein one or each of the adjustment operations comprises the following. A global map dataset is determined on the basis of feature data, using a global pooling operation, e.g. global average pooling. The feature data comprise the input feature data or the intermediate feature data of the one or of one of the multiple intermediate layers. The intermediate feature data of the one or of another of the multiple intermediate layers are then adjusted on the basis of the global map dataset.

In one example embodiment of the present invention, adjusting the intermediate feature data comprises at least one of the following procedures: adding the global map dataset and the intermediate feature data, multiplying the global map dataset by the intermediate feature data, or concatenating the global map dataset and the intermediate feature data. If a number of channels of the global map dataset and the intermediate feature data differ from one another, in particular during addition or multiplication, an interposed convolution can be provided.

In one example embodiment of the present invention, carrying out the alignment comprises multiple adjustment operations. Here, different intermediate feature data can then be adjusted in different adjustment operations of the multiple adjustment operations. Likewise, in different adjustment operations of the multiple adjustment operations, different global map datasets can be determined on the basis of different feature data.

In this way, the problem of the receptive field tearing open can be solved without significantly increasing the computational effort. Global context (i.e., the global map dataset) can be combined with local information (the sparse map datasets or the sparse data available there). This results in better performance with almost the same computational complexity or comparable performance with reduced computational complexity.

It is therefore provided to combine methods of global pooling (in an advantageous embodiment also extended forms, such as squeeze and excitation) with network architectures that are used to calculate, e.g., FCGF feature descriptors or correspondence evaluations calculated using DGR for the purpose of aligning two map datasets (e.g., in the form of point clouds) in order to prevent the receptive field of the network from being unnaturally reduced by unfavorable input data.

In summary, a network architecture, such as that described in C. Choy, W. Dong, and V. Koltun, "Deep global registration", in Proceedings of the IEEE/CVF conference on computer vision and pattern recognition, pp. 2514-2523, 2020, or C. Choy, J. Park, and V. Koltun, "Fully convolutional geometric features", in Proceedings of the IEEE/CVF International Conference on Computer Vision, pp. 8958-8966, 2019 can thus be assumed. This network architecture is used for the purpose of aligning map datasets or point clouds that contain at least one layer with sparse convolutions. This network architecture, i.e., the machine learning algorithm in general, can be trained with given data and a given loss function, as described there.

However, according to an example embodiment of the present invention, the network architecture is now modified to the effect that global pooling is used to incorporate global context at, for example, different points in the network. For this purpose, any layer with feature data (input feature map, that is, for example, the direct network input, i.e., the input feature data, or a hidden layer, i.e., the intermediate feature data) with a certain number of channels (e.g. C channels) is processed on a parallel path added to the architecture with global pooling (e.g. global average pooling). In an advantageous form, this can be done using a squeeze and excitation block, for example. The result of this block (a so-called 1_C feature map) is then combined with any other feature map (i.e., an intermediate layer with intermediate feature data) of the network, e.g. by addition, multiplication or concatenation by position. If the latter feature map (intermediate feature data) has, without loss of generality, a number of channels (e.g. D channels) different from C for the case of addition or multiplication, this number can be aligned with an interposed convolution, e.g. a so-called 1×1 convolution.

The described modification of the network can, as mentioned, be repeated as often as desired and for any combination of layers. Analogously to the presentation in J. Hu, L. Shen, and G. Sun, "Squeeze- and excitation networks", in Proceedings of the IEEE conference on computer vision and pattern recognition, pp. 7132-7141, 2018, any network architectures, such as Inception- or ResNet-like architectures, can be modified. However, further modifications to the training framework, e.g. relating to data or loss function, are not necessary. The added layers can remain in the network at runtime. Due to the very small sizes of the globally pooled data (global map dataset), the number of additional operations arising is very small and increases the runtime only insignificantly.

A system according to the present invention for data processing or a computing unit, e.g., a control device or a control unit of a mobile device, or a server or other computer, is configured, in particular in terms of programming, to carry out a method according to the present invention, e.g. in one of the described embodiments.

The present invention also relates to a mobile device that has such a system for data processing or that is configured to obtain navigation information determined as described above. The mobile device also has a sensor for detecting environmental information and is configured to navigate on the basis of the navigation information.

Furthermore, the implementation of a method according to the present invention in the form of a computer program or computer program product having program code for carrying out all the method steps is advantageous because it is particularly low-cost, in particular if an executing control unit is also used for further tasks and is therefore present anyway. Finally, a machine-readable storage medium is provided with a computer program as described above stored thereon. Suitable storage media or data carriers for providing the computer program are, in particular, magnetic, optical, and electric storage media, such as hard disks, flash memory, EEPROMs, DVDs, and others. It is also possible to download a program via computer networks (Internet, intranet, etc.). Such a download can be wired or wireless (e.g., via a WLAN network or a 3G, 4G, 5G or 6G connection, etc.).

Further advantages and embodiments of the present invention can be found in the description and the figures.

The present invention is illustrated schematically in the figures on the basis of an embodiment and is described below with reference to the figures.

DETAILED DESCRIPTION OF EXAMPLE EMBODIMENTS

Figure 1:
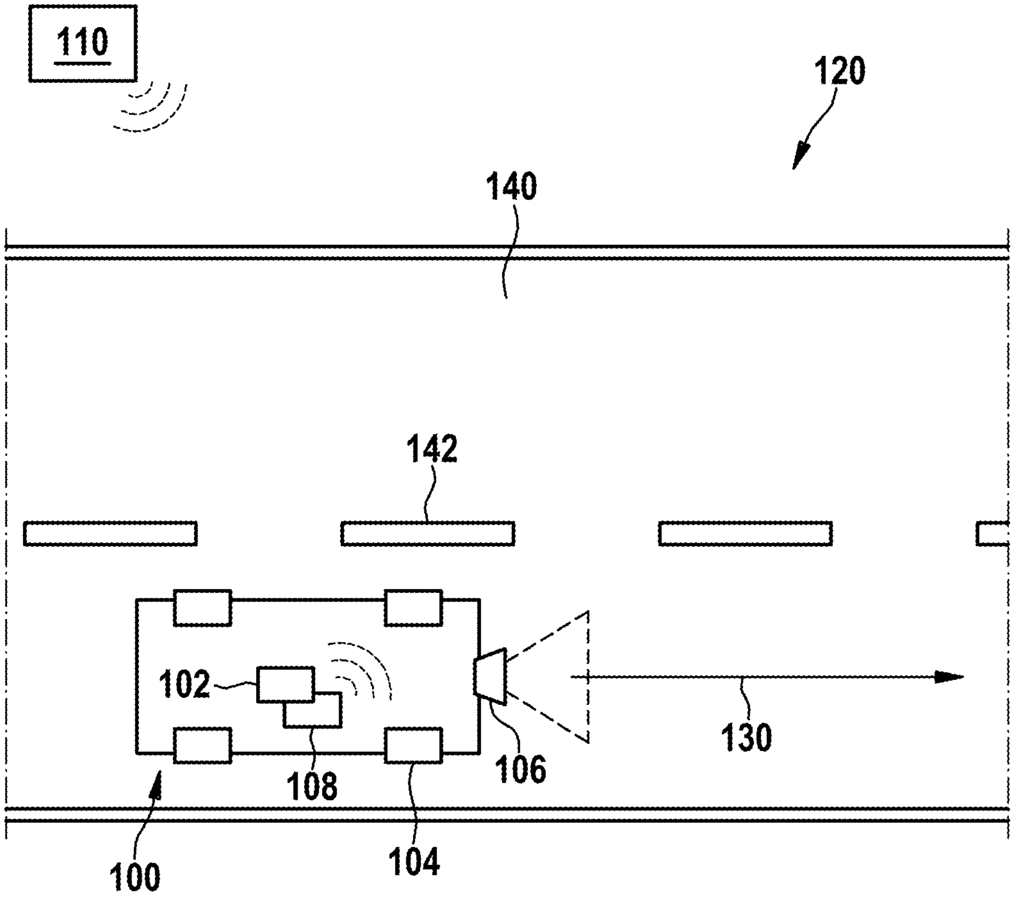
FIG. 1 schematically shows a mobile device in an environment to explain the present invention.

FIG. 1 shows a mobile device 100 in an environment 120 schematically and by way of example to explain the present invention. The environment 120 here comprises, by way of example, a road 140 with lane markings 142. The mobile device 100 is, by way of example, a vehicle with a control or regulating unit 102 and a drive unit 104 (with wheels) for moving the vehicle 100, e.g. along a movement path 130, which in this case runs, by way of example, along the road 140 or a lane of the road.

Furthermore, the vehicle 100 has, by way of example, a sensor 106 designed as a camera with a detection range. For better illustration, the detection range is chosen to be relatively small here; in practice, however, the detection range can also be up to 180°, for example. Further cameras can also be provided. The environment 120 can be detected by means of the sensor 106, i.e., images of the environment or environmental information in general can be generated or detected.

Furthermore, the vehicle 100 has a computing unit or a system 108 for data processing, e.g. a control unit, by means of which data can be exchanged with a higher-level system 110, e.g. via an indicated radio link. In the system 110, for example, movement paths (or navigation information in general) can be determined, which are then transmitted to the system 108 in the vehicle 100, which should then follow said movement paths. However, it can also be provided for a movement path (or navigation information in general) to be determined in the system 108 itself or otherwise obtained there. Instead of a movement path or the navigation information, the system 108 can also obtain, for example, control information that has been determined on the basis of a movement path or the navigation information and according to which the control or regulating unit 102 can move the vehicle 100 via the drive unit 104 in order to follow a movement path. The movement path 130 is indicated here only by way of example.

To determine the navigation information mentioned, the images captured by the camera 106—or generally map datasets, in particular in the case of other types of sensors—can be used. For example, an image may comprise or depict the lane markings or their positions, while other information in the image is disregarded. This is then a so-called sparse map dataset.

Figure 2:
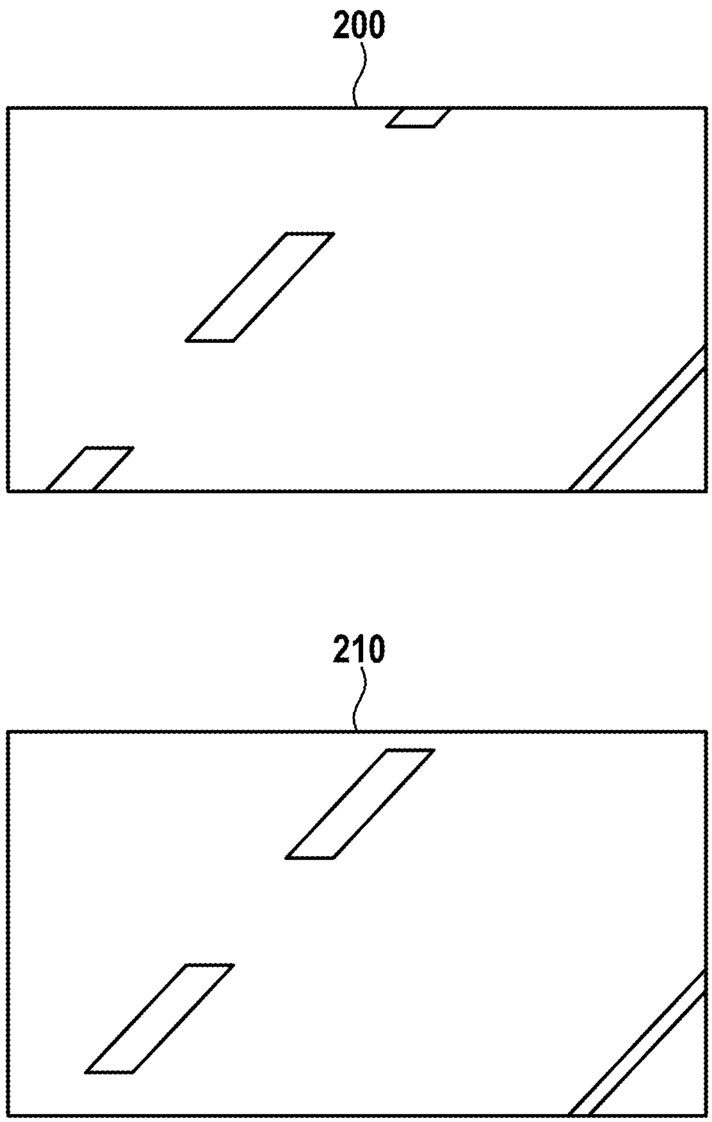
FIG. 2 schematically shows map datasets to explain the present invention.

FIG. 2 schematically shows two such map datasets or images for explanation. These map datasets or images may, for example, have been captured by the camera of the vehicle in FIG. 1. Lane markings can be seen in both map dataset 200 and map dataset 210 but at different positions within the image representing the map dataset. However, apart from the lane markings, there is no further information in the images, i.e., these are sparse map datasets.

As part of the navigation of the vehicle, the two map datasets 200 and 210 are now to be aligned, i.e., matched, with one another in order to find a transformative relation (or transformation) that maps the one map dataset onto the other map dataset. This transformative relation then represents a movement of the vehicle between the points in time at which the two map datasets or images were captured. This applies in particular if multiple observations come from one vehicle. If mapping and localization are decoupled, it can be spatially the same or a similar observation made at very different points in time by multiple vehicles.

At this point it should be mentioned that the two images or map datasets are shown only by way of example and for explanation purposes. Instead of two images, an image and an existing map can also be aligned, with the map itself again being based on images. After the alignment, the new image can then be used to expand the map. In this case, one of the map datasets would be the map, while the other of the map datasets would be a (new) image.

Figure 3:
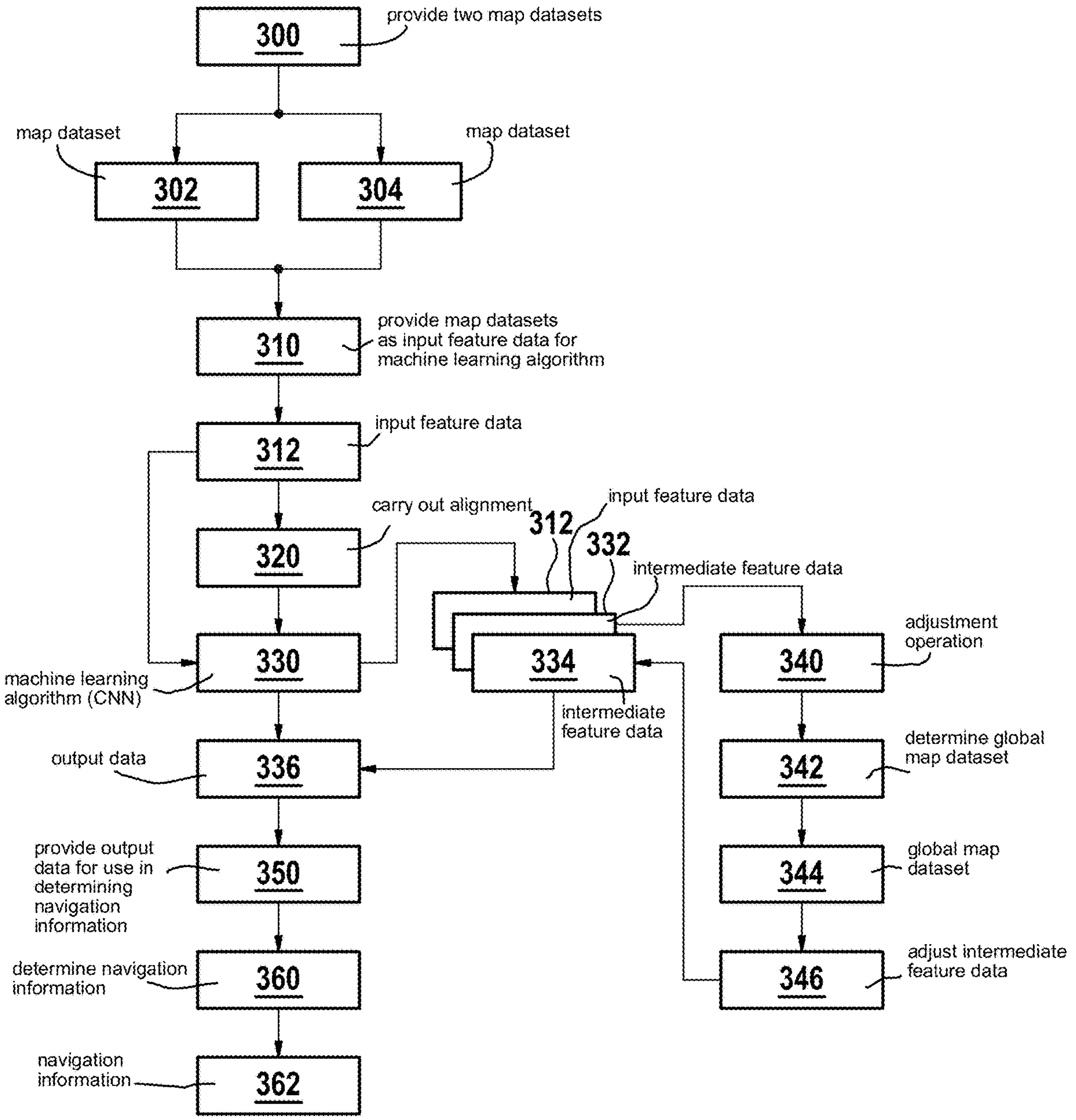
FIG. 3 schematically shows a sequence of a method in an example embodiment to explain the present invention.

FIG. 3 schematically shows a sequence of a method in an embodiment to explain the present invention. In a step 300, two map datasets 302, 304 are provided, each containing environmental information. As mentioned, in at least one of the two map datasets, the environmental information was collected from the mobile device and/or the environment by means of a mobile device sensor. In addition, at least one of the two map datasets is a sparse map dataset, as explained with reference to FIG. 2.

In a step 310, the two map datasets are provided as input feature data 312 for a machine learning algorithm, e.g. a CNN. It is also possible that the input feature data are determined on the basis of the two map datasets. As already mentioned above, feature descriptors can be extracted here, for example. The input feature data represent the input data for the machine learning algorithm.

In a step 320, an alignment, i.e., a matching, of the two map datasets is then carried out. This is done using a machine learning algorithm 330, e.g. a CNN, and on the basis of sparse convolution. The input feature data 312 are therefore fed to the CNN as input data (network input). Output data 336 are obtained in the process, which then comprise information about a transformative relation between the two map datasets.

The CNN 330 can comprise multiple intermediate layers (so-called hidden layers). The input feature data (input feature map) can be processed via various intermediate feature data (feature maps), e.g. 332, 334, in the intermediate layers to form the output data 340. Depending on the type of CNN, there may of course be more intermediate layers or intermediate feature data.

For example, an adjustment operation 340 is now carried out in which, in step 342, a global map dataset 344 is determined on the basis of feature data using global pooling. The feature data can comprise or be, for example, the input feature data or, as shown here by way of example, the intermediate feature data of one of the multiple intermediate layers.

In a step 346, the intermediate feature data of another of the multiple intermediate layers, here for example the intermediate feature data 334, are then adjusted on the basis of the global map dataset 344.

There may be a plurality of these adjustment operations 340, in which case different feature data are used in each case to obtain the relevant global map dataset, and other intermediate feature data are also adjusted.

As mentioned, the adjustment can comprise, for example, addition, multiplication or concatenation, possibly with interposed convolution if necessary.

These output data 336 are then provided, in step 350, for use in determining the navigation information. In particular, in step 360, navigation information 362 is determined on the basis of the output data, wherein the navigation information comprises, for example, a map of the environment and/or a trajectory for the mobile device.

Figure 4:
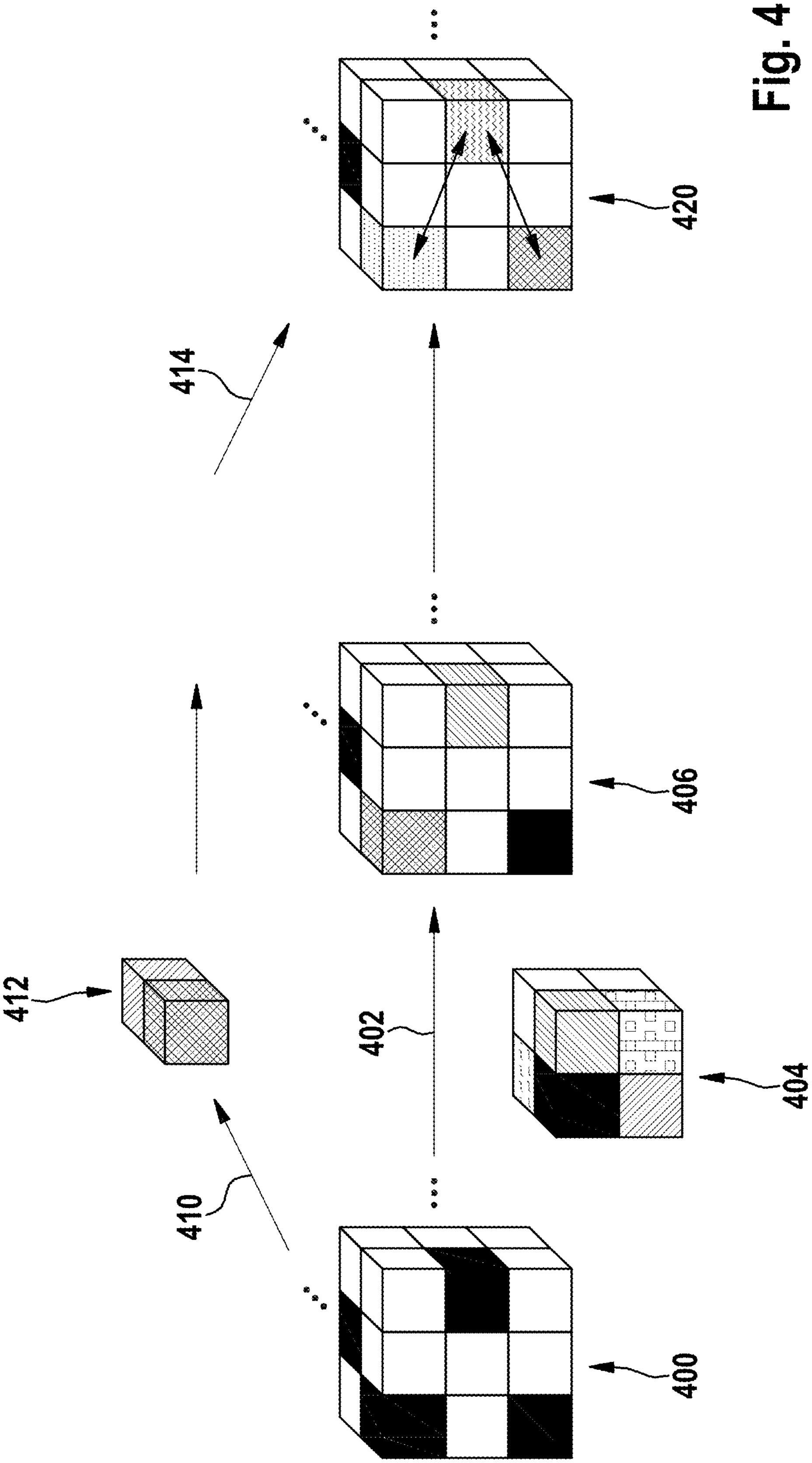
FIG. 4 schematically shows an alignment of map datasets.

In FIG. 4, such an alignment or matching is illustrated again in a different view. Here, a sparse convolution 402 is carried out from an input feature map 400 (3D here by way of example), i.e., feature data (e.g. the network input or in a hidden layer). A kernel 404 is used here, which is applied to the input feature map 400 to obtain an output feature map 406 (e.g. in a hidden layer).

In the input feature map 400, the underlying sparse map dataset can be seen, which is represented by the dark cubes (information) in comparison with the light cubes (no information). Since the kernel 404 in this example only covers two cubes, when applied to the input feature map 400, there is a gap between the dark cubes that the kernel cannot bridge. As a result, there was or is no interaction between dark cubes in the output feature map 406.

This is where global pooling 410 is applied, in which information is extracted from the input feature map 400, the global map dataset 412, which represents an interaction between cubes of the input feature map 400. This is then combined with the output feature map 406 in a step 414, so that an interaction or a relationship between the dark cubes (which represent the information) is then generated there—via the information present in the global map dataset 412.

What is claimed is:

1. A method for aligning two map datasets for determining navigation information for a mobile device that is moving or is to move in an environment, the method comprising the following steps:

providing two map datasets, each containing environmental information, wherein in the two map datasets the environmental information was collected from the mobile device and/or the environment by a sensor of the mobile device, and wherein at least one of the two map datasets is a sparse map dataset;

providing the two map datasets as input feature data or determining the input feature data based on the two map datasets; and carrying out an alignment of the two map datasets using a machine learning algorithm which includes a convolutional neural network based on sparse convolution, wherein;

output data are generated from the input feature data via intermediate feature data in one or more intermediate layers;

the output data include information about a transformative relation between the two map datasets;

the transformative relation maps one map dataset onto the other map dataset and represents a movement of the mobile device between points in time at which the two map datasets were collected; and the carrying out of the alignment includes one or more adjustment operations, each including:

determining a global map dataset based on feature data, using a global pooling operation, wherein the feature data include the input feature data or the intermediate feature data of one of the one or more intermediate layers, and adjusting the intermediate feature data of the one or of another of the one or more intermediate layers based on the global map dataset by:

combining, by position, the global map dataset and the intermediate feature data by concatenation, wherein the combining incorporates global context into the convolutional neural network to prevent a receptive field of the convolutional neural network from being reduced; and providing the output data for use in determining the navigation information.

2. The method according to claim 1, wherein the adjusting of the intermediate feature data includes at least one of the following procedures:

addition of the global map dataset and the intermediate feature data, multiplication of the global map dataset by the intermediate feature data, concatenation of the global map dataset and the intermediate feature data.

3. The method according to claim 1, wherein the adjusting of the intermediate feature data, when a number of channels of the global map dataset and the intermediate feature data differ from one another, includes an interposed convolution.

4. The method according to claim 1, wherein the carrying out of the alignment includes multiple adjustment operations.

5. The method according to claim 4, wherein different intermediate feature data are adjusted in different adjustment operations of the multiple adjustment operations.

6. The method according to claim 4, wherein in different adjustment operations of the multiple adjustment operations, different global map datasets are determined based on different feature data.

7. The method according to claim 1, wherein the sensor of the mobile device includes one of the following sensors: a camera, a radar sensor, a lidar sensor, an ultrasonic sensor.

8. The method according to claim 1, wherein the environmental information of at least one of the two map datasets includes images and/or positions of at least one of the following objects: lane markings, road posts, traffic signs.

9. The method according to claim 1, further comprising:

determining the navigation information based on the output data, wherein the navigation information includes a map of the environment and/or a trajectory for the mobile device.

10. A system for data processing, comprising an arrangement configured to align two map datasets for determining navigation information for a mobile device that is moving or is to move in an environment, the arrangement configured to:

provide two map datasets, each containing environmental information, wherein in the two map datasets the environmental information was collected from the mobile device and/or the environment by a sensor of the mobile device, and wherein at least one of the two map datasets is a sparse map dataset;

provide the two map datasets as input feature data or determining the input feature data based on the two map datasets; and carry out an alignment of the two map datasets using a machine learning algorithm which includes a convolutional neural network based on sparse convolution, wherein:

output data are generated from the input feature data via intermediate feature data in one or more intermediate layers;

the output data include information about a transformative relation between the two map datasets;

the transformative relation maps one map dataset onto the other map dataset and represents a movement of the mobile device between points in time at which the two map datasets were collected; and the carrying out of the alignment includes one or more adjustment operations, each including:

determining a global map dataset based on feature data, using a global pooling operation, wherein the feature data include the input feature data or the intermediate feature data of one of the one or more intermediate layers, and adjusting the intermediate feature data of the one or of another of the one or more intermediate layers based on the global map dataset by:

combining, by position, the global map dataset and the intermediate feature data by concatenation, wherein the combining incorporates global context into the convolutional neural network to prevent a receptive field of the convolutional neural network from being reduced; and provide the output data for use in determining the navigation information.

11. A mobile device configured to obtain navigation information determined by:

providing two map datasets, each containing environmental information, wherein in the two map datasets the environmental information was collected from the mobile device and/or an environment of the mobile device by a sensor of the mobile device, and wherein at least one of the two map datasets is a sparse map dataset;

providing the two map datasets as input feature data or determining the input feature data based on the two map datasets; and carrying out an alignment of the two map datasets using a machine learning algorithm which includes a convolutional neural network based on sparse convolution, wherein:

output data are generated from the input feature data via intermediate feature data in one or more intermediate layers;

the output data include information about a transformative relation between the two map datasets;

the transformative relation maps one map dataset onto the other map dataset and represents a movement of the mobile device between points in time at which the two map datasets were collected; and the carrying out of the alignment includes one or more adjustment operations, each including:

determining a global map dataset based on feature data, using a global pooling operation, wherein the feature data include the input feature data or the intermediate feature data of one of the one or more intermediate layers, and adjusting the intermediate feature data of the one or of another of the one or more intermediate layers based on the global map dataset by:

combining, by position, the global map dataset and the intermediate feature data by concatenation, wherein the combining incorporates global context into the convolutional neural network to prevent a receptive field of the convolutional neural network from being reduced;

providing the output data for use in determining the navigation information; and determining the navigation information based on the output data, wherein the navigation information includes a map of the environment and/or a trajectory for the mobile device;

wherein the mobile device has a sensor for detecting the environmental information and is configured to navigate based on the navigation information with a control or regulating unit and a drive unit for moving the mobile device according to the navigation information.

12. The mobile device according to claim 11, wherein the which is a vehicle that moves in an at least partially automated manner, including: a passenger transport vehicle or a goods transport vehicle or a robot or a household robot or a cleaning robot or a floor-cleaning device or a street-cleaning device or a lawnmower robot or a drone.

13. A non-transitory computer-readable storage medium on which is stored a computer program for aligning two map datasets for determining navigation information for a mobile device that is moving or is to move in an environment, the computer program, when executed by a computer, causing the computer to perform the following steps:

providing two map datasets, each containing environmental information, wherein in the two map datasets the environmental information was collected from the mobile device and/or the environment by a sensor of the mobile device, and wherein at least one of the two map datasets is a sparse map dataset;

providing the two map datasets as input feature data or determining the input feature data based on the two map datasets; and carrying out an alignment of the two map datasets using a machine learning algorithm which includes a convolutional neural network based on sparse convolution, wherein:

output data are generated from the input feature data via intermediate feature data in one or more intermediate layers;

the output data include information about a transformative relation between the two map datasets;

the transformative relation maps one map dataset onto the other map dataset and represents a movement of the mobile device between points in time at which the two map datasets were collected; and the carrying out of the alignment includes one or more adjustment operations, each including:

determining a global map dataset based on feature data, using a global pooling operation, wherein the feature data include the input feature data or the intermediate feature data of one of the one or more intermediate layers, and adjusting the intermediate feature data of the one or of another of the one or more intermediate layers based on the global map dataset by:

combining, by position, the global map dataset and the intermediate feature data by concatenation, wherein the combining incorporates global context into the convolutional neural network to prevent a receptive field of the convolutional neural network from being reduced; and providing the output data for use in determining the navigation information.

* * * * *